PATENTED JUL 2 1974 3,821,853
SHEET 1 OF 4
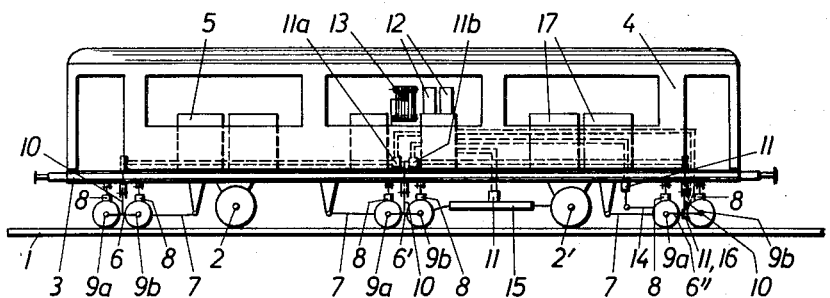
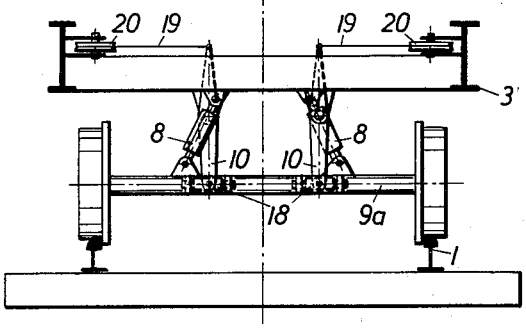
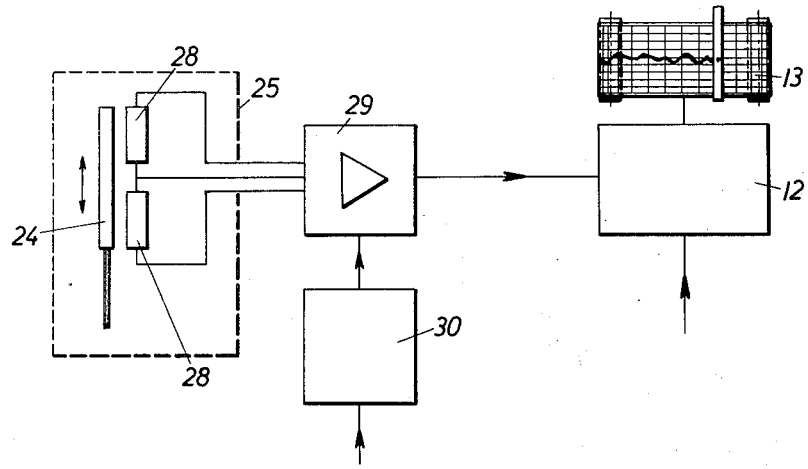
INVENTORS
FRANZ PLASSER
JOSEF THEURER
BY Kurt Kelman
AGENT

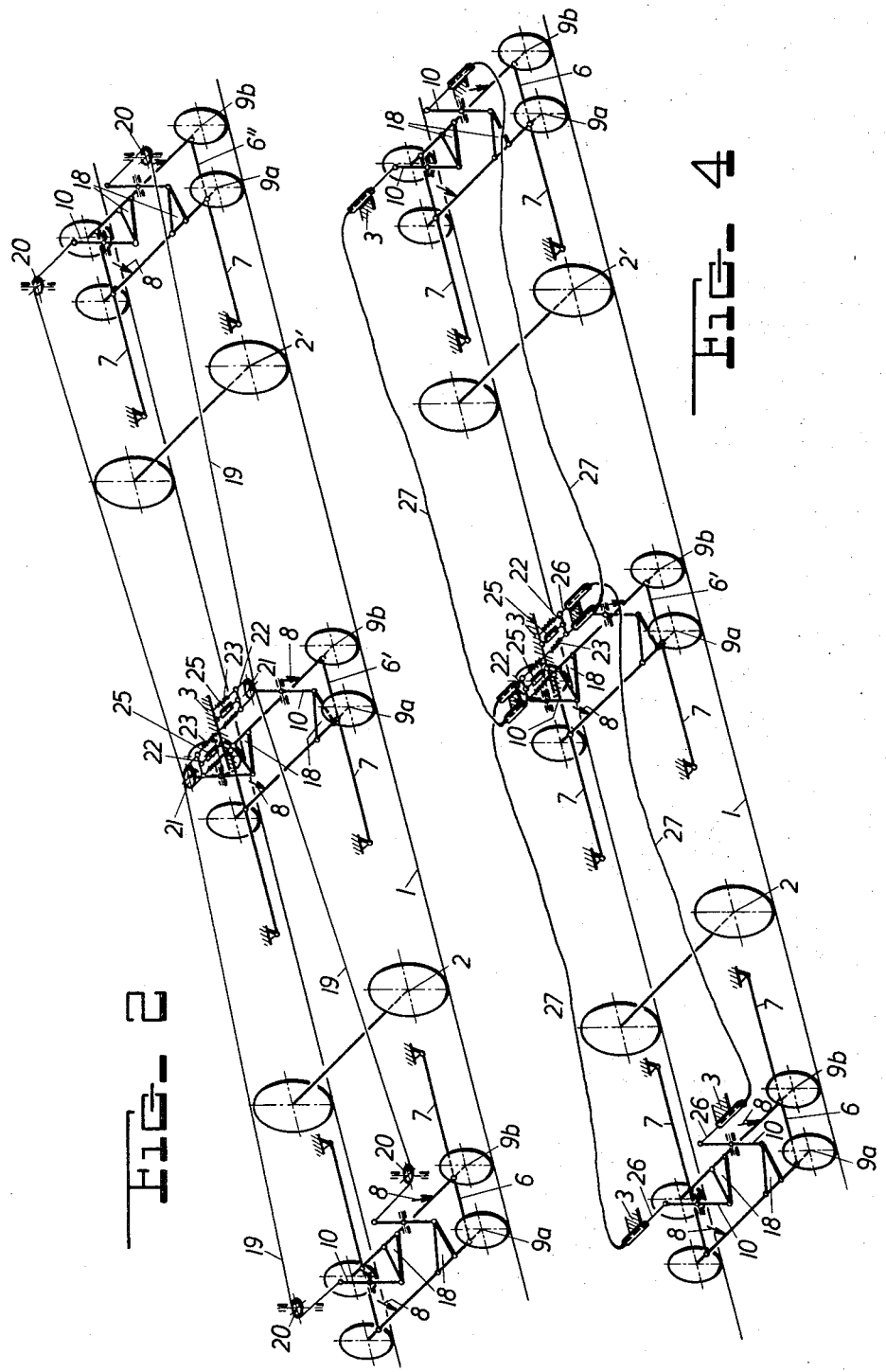

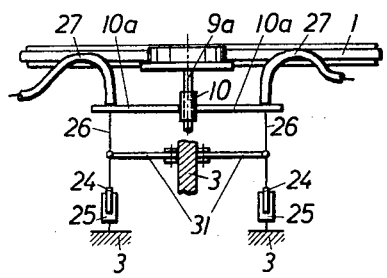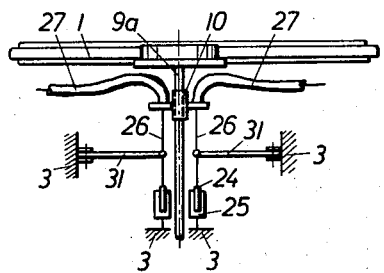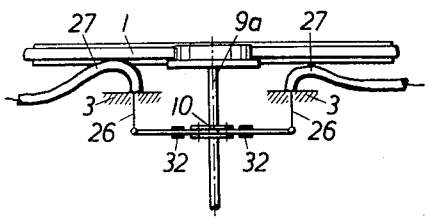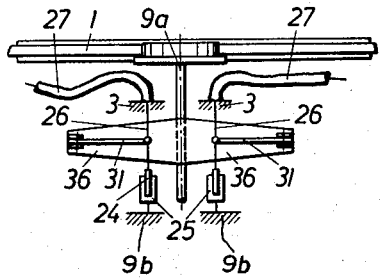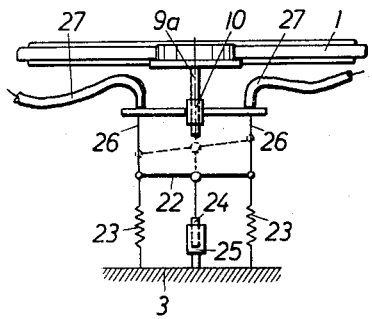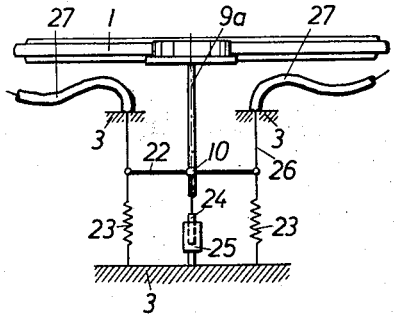

MOBILE TRACK SURVEY APPARATUS

The present invention relates to improvements in mobile track survey apparatus, and more particularly apparatus for measuring the lateral deviations in the ordinates of rail alignment reference points.

Apparatus of this type has a chassis movable on the rails of the track in the direction of track elongation and comprising three measuring gears mounted on the chassis at rail alignment reference points spaced from each other in the direction of track elongation. Two of the measuring gears are positioned near respective ends of the chassis and a center measuring gear is positioned therebetween. Each of the measuring gears includes at least one axle biased against a respective one of the track rails into engagement therewith and mounted on the chassis for relative transverse movement in respect thereof whereby the transverse movement of the measuring axle measures deviations in the ordinate of the rail alignment reference point engaged by the axle from a desired alignment. In known apparatus of this type, the transverse movements of the rail sensors are transmitted directly to mechanical indicators or recorders which show the corresponding deviations. Such a direct mechanical transmission of the rail sensor movements has many sources of error producing corresponding measurement errors. In addition, the mechanical transmissions must be extended into the interior of the measuring cars which house the indicator or recorder, thus producing long mechanical transmission paths causing additional inaccuracies and involving constructive difficulties.

It is the primary object of this invention to overcome these and other disadvantages of conventional track survey apparatus of this type, and to provide such an apparatus which measures track ordinates most simply and accurately.

This and other objects are accomplished with a measuring device movably mounted on the chassis and interposed between the end measuring gears. An independent transmission between each measuring axle of the end measuring gears and the measuring device transmits the transverse movement of the respective end measuring axle to the measuring device which is so mounted that the combination (sum or difference) of the transverse movements of the two end measuring axles and of the center measuring axle moves the measuring device between the end reference points a distance corresponding to the ordinate at the center measuring point. An electric measuring signal generator and transmitter is connected to the measuring device for generating and transmitting a signal proportional to the movement of the measuring device, and an indicator and/or recorder is connected to the signal generator and transmitter for indicating and/or recording the measuring signal.

In such an apparatus, the mechanical transmission paths are relatively short, thus excluding one source of possible error. The mechanical movements are translated into an electrical measuring signal which may be readily transmitted to a signal indicator or recorder mounted on a track survey car.

In one embodiment of the present invention, the measuring device is constituted by two flexible rods, such as elongated spring leafs, having free ends attached to the transmissions for transverse movement thereof and also movable in response to the movement of the center measuring axle. In another embodiment, the measuring device is constituted by an equilibrium lever whose two ends are attached to the transmissions for transverse movement thereof and also movable in response to the movement of the center measuring axle.

If the transmissions are Bowden cables, the transverse movements of the end measuring axles to the measuring device will be effected without play and vibration-free. However, simple cable transmissions will often serve the purpose.

According to one preferred feature of this invention, the measuring signal generator and transmitter includes an inductance bridge whose housing is mounted on the chassis and whose armature is connected to the measuring device for movement therewith.

According to another feature of the invention, the signal generator may consist simply of wire strain gages mounted on the flexible measuring rods, preferably near their clamped ends opposite the free ends thereof since this is the region of their greatest deformation. An electrical measuring bridge generates the measuring signals and the signals may be amplified, if desired, before being transmitted to the signal indicator and/or recorder.

If it is desired to measure simultaneously but separately the ordinates, i.e., the lateral alignment, of both rails, each measuring gear comprises two measuring axles respective ones of which are biased into engagement with a respective track rail. One of the measuring devices is common to, and associated with, each two of the end measuring axles biased against the same rail so that the ordinate of each of the rails may be separately measured and indicated.

Preferably, each measuring gear is mounted for upward movement out of contact with the track on a pivotal support rod underneath the chassis. The chassis has two running gears and may be part of a track survey car or form the frame of a track tamper and liner. In the latter case, the measuring signals may be used directly for controlling the track lining tools so that the track may be continuously lined in response to these signals.

The above and other objects, advantages and features of the present invention will be more fully understood by reference to the following detailed description of some now preferred embodiments thereof, taken in conjunction with the accompanying schematic drawing wherein FIG. 1 is a side view of a track surveying car incorporating the instrumentation of this invention;

FIG. 2 is a simplified perspective view of one embodiment of the invention;

FIG. 3 is a front view of this embodiment, at an enlarged scale;

FIG. 4 is a view similar to that of FIG. 2 of a modified embodiment;

FIG. 5 shows a circuit diagram of a signal generator and transmitter used in the embodiments of FIGS. 2 and 4;

FIGS. 8 to 13 show additional embodiments.

Figure 6:
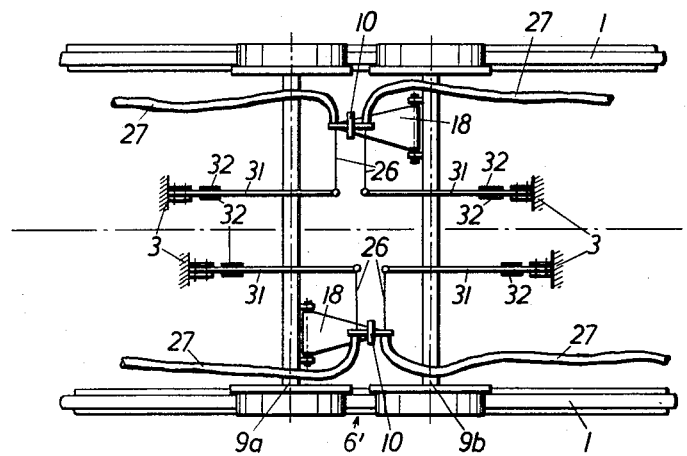
FIG. 6 is a top view of the central portion of a further embodiment.

Referring now to the drawing, wherein like reference numerals designate like parts operating in a like mana differential reactance with an axially movable armature 24 is mounted. Two measuring coils 28 are electrically connected to form half an inductance bridge connected to a carrier frequency amplifier 29, the bridge being completed by two precision resistances (not shown). The amplifier receives current from an electrical current supply circuit through an operating voltage stabilizer 30. When the armature 24 moves, the Wheatstone bridge is unbalanced and a measuring signal (current or voltage) is generated. This signal is proportional to the movement of the armature which, in turn, corresponds to the movement of lever 22. The signal is amplified at 29 and, after being rectified, the measuring signal is transmitted to an indicator 12 and/or to a signal recording instrument 13.

In the embodiment of FIG. 6, the levers 22 measuring the measuring axle movements and transmitting the same to the measuring signal generator and transmitter are replaced by flexible rods 31 having one end attached to chassis 3 while their free outer ends are attached to the cores 26 of the Bowden cables. All parts designated by like reference numerals operate in the same manner as described in connection with FIG. 4 and requiring no repetition.

The flexible rods 31 are preferably made of tempered spring steel and, adjacent their points of attachment to the chassis, they carry wire strain gages 32 of known construction which, for instance, may be bonded to the rods. The expansion or contraction of the metal wires embedded in the gages produces a change in the electrical resistance in the gages which generates a proportional current in an associated measuring bridge so as to constitute a measuring signal generator and transmitter whose signals are responsive to the flexing of the rods 31 and thus to the transverse movements of the measuring axles 9a, 9b transmitted by the Bowden cables to the rods 31.

Figure 7:
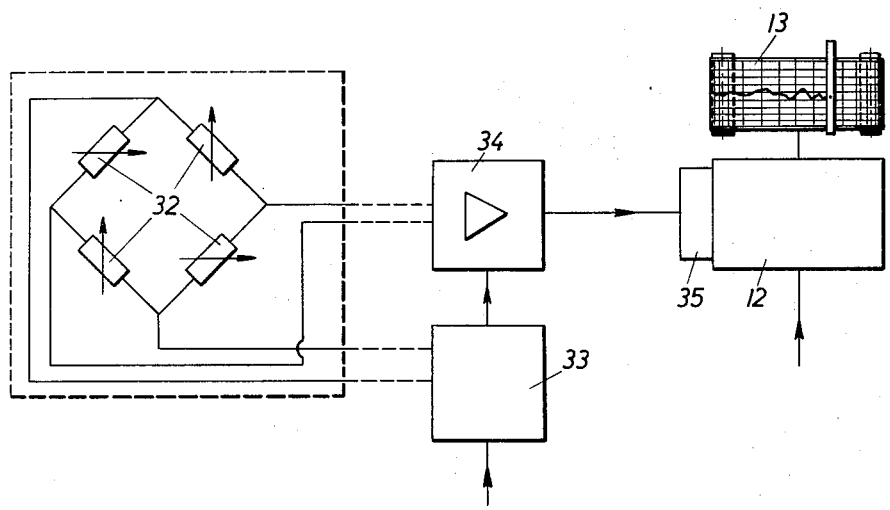
FIG. 7 is a circuit diagram of a signal generator and transmitter used in the latter embodiment.

FIG. 7 schematically illustrates the measuring bridge constituted by the wire strain gages 32, the bridge containing the gages of both flexible rods 31 associated with the same rail 1 so that the average deflection of the two associated rods is combined with the deflection produced by the measuring axles of the center gear. Current from a current supply circuit is fed through voltage stabilizer 33 to the measuring bridge and to the carrier frequency amplifier 34, and the amplified measuring signal is rectified and possibly filtered at 35 before being transmitted to the indicator 12 and/or the recorder 13.

In the modification of FIG. 8, the inner ends of the flexible rods 31 are fixed to chassis 3, and the upper arms of pivotal levers 10 associated with the measuring axles of the center gear 6' carry extensions 10a, 10a which are parallel to the rods 31. The sleeves 27 of the Bowden cables are attached to the lever extensions. Also, while the measuring signal generator and transmitter may be formed by wire strain gages in this modification, too, it is also possible to use a signal generator and transmitter 24, 25, as illustrated, functioning in the same manner as hereinabove described.

FIG. 9 shows the embodiment of FIG. 6 wherein the wire strain gages 32 have been replaced by inductance bridge 24, 25 in the manner of FIG. 8.

FIGS. 10 and 11 illustrate embodiments wherein the sleeves 27 of the Bowden cables associated with the measuring axles of the center gear are also attached to chassis 3 and the transverse movement of the measuring axle 9a of the center gear is transmitted directly to the flexible rods 31 by interconnecting them. In the modification of FIG. 10, one of the ends of flexible rods 31 are clamped to the upper arm of pivotal lever 10 of the measuring axle 9a of the center gear. In the modification of FIG. 11, the upper arm of the pivotal lever 10 carries brackets 36 to which the flexible rods are clamped. The arrangement of the pivotal levers 10 is coordinated with similar pivotal levers associated with the measuring axles of the end gears 6, 6'' which levers are interconnected by the Bowden cables 26, 27 in the previously described manner. In these embodiments, the signal generators and transmitters 24, 25 are mounted on brackets 9b, 9b affixed to measuring axle 9a.

FIG. 12 shows the measuring signal generator and transmitter of FIG. 4 in detail while the modification of FIG. 13 shows the ends of the sleeves 27 of the Bowden cables 26, 27 which are adjacent the center measuring gear also attached to chassis 3. In this modification, the equilibrium lever 22 is linked directly to the measuring axle 9a of the center gear, i.e., to the upper arm of its pivotal lever 10 intermediate the ends of lever 22.

The resistance strain gage means and its mounting on a flexible rod is more fully described and claimed in copending application Ser. No. 155,861, filed simultaneously herewith, entitled "Mobile Track Survey Apparatus for Determining a Track Parameter," of which the joint inventor Josef Theurer is also a joint inventor.

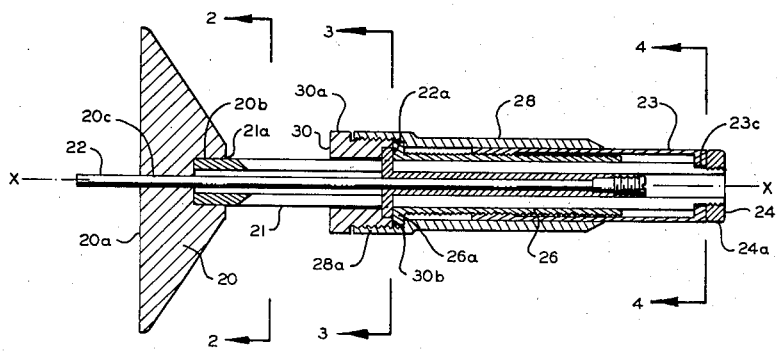

We claim:
1. A mobile track survey apparatus for determining the ordinate of at least one rail of a track and having a chassis movable on the track rails in the direction of track elongation, comprising
  1. three rail sensing axles mounted on the chassis for lateral movement in respect thereto,
     a. the sensing axles being spaced from each other in the direction of track elongation,
     b. two of the rail sensing axles being positioned at respective reference end points for measurements of the track ordinate,
     c. the third rail sensing axle being positioned therebetween at a measuring point for the track ordinate, and
     d. the sensing axles being biased against a respective one of the track rails into engagement therewith whereby the transverse movement of the sensing axles measures deviations in the ordinate;
  2. an ordinate measuring device mounted for lateral movement on the chassis between the two rail sensing axles, the measuring device comprising
     a. a pair of flexible rods, one of the ends of the flexible rods being fixedly attached to the chassis;
  3. an independent transmission between each of the two rail sensing axles and the measuring device for transmitting the movement of said two rail sensing axles independently to the measuring device,
     a. a free end of the flexible rods being connected to a respective one of the transmissions, and
     b. the measuring device being moved a distance corresponding to the ordinate at the measuring point by the combination of the lateral movements of the two sensing axles and of the third sensing axle;

4. an electrical measuring signal generator and transmitter connected to the pair of flexible rods of the measuring device for generating and transmitting an electrical signal proportional to the distance of movement of the measuring device; and
5. a signal indicator including a signal recorder connected to the signal generator and transmitter for indicating the measuring signal.

2. The mobile track survey apparatus of claim 1, wherein the transmissions are Bowden cables having a sleeve surrounding a wire.

3. The mobile track survey apparatus of claim 2, wherein one end of the sleeves of the Bowden cables is attached to the third sensing axle for movement therewith while the other sleeve end is fixed to the chassis, and one end of the wires of the Bowden cables is attached to the measuring device while the other end thereof is fixed to a respective one of the two sensing axles for movement therewith.

4. The mobile track survey apparatus of claim 2, wherein both ends of the sleeves of the Bowden cables are attached to the chassis, and one end of the wires of the Bowden cables is attached to the measuring device and the other wire end is attached to the two sensing axles for movement therewith, the measuring device being connected for movement with the third sensing axle.

5. A mobile track survey apparatus for determining the ordinate of at least one rail of a track and having a chassis movable on the track rails in the direction of track elongation, comprising
1. three measuring gears mounted on the chassis for lateral movement in respect thereto, each measuring gear being constituted by a pair of like rail sensing axles, a respective one of the axles of each of said pairs being biased into engagement with a respective one of the track rails, whereby the transverse movement of the sensing axles measures deviations in the respective rail ordinates,
   a. the measuring gears being spaced from each other in the direction of track elongation,
   b. two of the measuring gears being positioned at respective reference end points for measurements of the ordinates of each rail,
   c. the third measuring gear being positioned therebetween at a measuring point for the ordinate of each rail;
2. a respective ordinate measuring device mounted for lateral movement on the chassis between the two measuring gears, each measuring device being common to the three sensing axles biased against a respective one of the rails;
3. an independent transmission in common between the sensing axles biased against a respective one of the rails of each of the two measuring gears and the measuring device common thereto for transmitting movement of said rail sensing axles of the two measuring gears independently to the common measuring device,
   a. the measuring devices being moved a distance corresponding to the ordinates at the measuring point by the combination of the lateral movements of the two measuring gears and the third measuring gear;
4. an electrical measuring signal generator and transmitter connected to each measuring device for generating and transmitting an electrical signal proportional to the distance of movement of the respective measuring device; and
5. an indicator connected to each signal generator and transmitter for indicating the measuring signal thereof for separate and independent measurement and indication of the ordinate of each rail.

6. The mobile track survey apparatus of claim 5, further comprising upwardly pivotal support rods mounting respective ones of the measuring gears on the chassis for upward movement out of contact with the track.

7. A mobile track survey apparatus for determining the ordinate of at least one rail of a track and having a chassis movable on the track rails in the direction of track elongation, comprising
1. three rail sensing axles mounted on the chassis for lateral movement in respect thereto,
   a. the sensing axles being spaced from each other in the direction of track elongation,
   b. two of the rail sensing axles being positioned at respective reference end points for measurements of the track ordinate,
   c. the third rail sensing axle being positioned therebetween at a measuring point for the track ordinate, and
   d. the sensing axles being biased against a respective one of the track rails into engagement therewith whereby the transverse movement of the sensing axles measures deviations in the ordinate;
2. an ordinate measuring device mounted for lateral movement on the chassis between the two rail sensing axles, the measuring device comprising
   a. a pair of flexible rods, one of the ends of the flexible rods being fixedly attached to the chassis;
3. an independent transmission between each of the two rail sensing axles and the measuring device for transmitting the movement of said two rail sensing axles independently to the measuring device,
   a. the transmissions extending transversely of the flexible rods,
   b. a free end of the flexible rods being connected to a respective one of the transmissions,
   c. the transversely extending transmissions and the respective free ends of the flexible rods being movable by the lateral movement of the third sensing axle, and
   d. the measuring device being moved a distance corresponding to the ordinate at the measuring point by the combination of the lateral movements of the two sensing axles and of the third sensing axle;
4. an electrical measuring signal generator and transmitter connected to the pair of flexible rods of the measuring device for generating and transmitting an electrical signal proportional to the distance of movement of the measuring device; and
5. an indicator connected to the signal generator and transmitter for indicating the measuring signal.

8. A mobile track survey apparatus for determining the ordinate of at least one rail of a track and having a chassis movable on the track rails in the direction of track elongation, comprising
1. three rail sensing axles mounted on the chassis for lateral movement in respect thereto,
   a. the sensing axles being spaced from each other in the direction of track elongation, b. two of the rail sensing axles being positioned at respective reference end points for measurements of the track ordinate, c. the third rail sensing axle being positioned therebetween at a measuring point for the track ordinate, and d. the sensing axles being biased against a respective one of the track rails into engagement therewith whereby the transverse movement of the sensing axles measures deviations in the ordinate;

2. an ordinate measuring device mounted for lateral movement on the chassis between the two rail sensing axles, the measuring device comprising a. a pair of flexible rods, one of the ends of the flexible rods being fixedly attached to the third sensing axle;

3. an independent transmission between each of the two rail sensing axles and the measuring device for transmitting the movement of said two rail sensing axles independently to the measuring device, a. the transmissions extending transversely of the flexible rods, b. a free end of the flexible rods being connected to a respective one of the transmissions, and c. the measuring device being moved a distance corresponding to the ordinate at the measuring point by the combination of the lateral movements of the two sensing axles and of the third sensing axle;

4. an electrical measuring signal generator and transmitter connected to the pair of flexible rods of the measuring device for generating and transmitting an electrical signal proportional to the distance of movement of the measuring device; and 5. an indicator connected to the signal generator and transmitter for indicating the measuring signal.

9. A mobile track survey apparatus for determining the ordinate of at least one rail of a track and having a chassis movable on the track rails in the direction of track elongation, comprising a. three rail sensing axles mounted on the chassis for lateral movement in respect thereto, a. the sensing axles being spaced from each other in the direction of track elongation, b. two of the rail sensing axles being positioned at respective reference end points for measurements of the track ordinate, c. the third rail sensing axle being positioned therebetween at a measuring point for the track ordinate, and d. the sensing axles being biased against a respective one of the track into engagement therewith whereby the transverse movement of the sensing axles measures deviations in the ordinate;

2. an ordinate measuring device mounted for lateral movement on the chassis between the two rail sensing axles, the measuring device comprising a. a equilibrium lever having two ends, the lever being mounted for lateral movement with the third rail sensing axle and the ends of the lever being laterally movable with the two sensing axles;

3. an independent transmission between each of the two rail sensing axles and the measuring device for transmitting the movement of said two rail sensing axles independently to the measuring device, a. the transmissions extending transversely of the equilibrium lever, b. the two equilibrium lever ends being respectively connected to one of the transmissions and the lateral movement of the two sensing axles being transmitted to the lever ends by the transmissions, and c. the measuring device being moved a distance corresponding to the ordinate at the measuring point by the combination of the lateral movements of the two sensing axles and of the third sensing axle;

4. an electrical measuring signal generator and transmitter connected to the equilibrium lever of the measuring device for generating and transmitting an electrical signal proportional to the distance of movement of the measuring device; and 5. an indicator connected to the signal generator and transmitter for indicating the measuring signal.

10. The mobile track survey apparatus of claim 7, wherein the flexible rods extend substantially perpendicularly to the two sensing axles.

11. The mobile track survey apparatus of claim 5, further comprising two undercarriages movably mounting the chassis on the track rails, one of the measuring gears being arranged between the undercarriages and two of the measuring gears being arranged adjacent the undercarriages.

* * * * *

United States Patent [19]
Koch et al.

[11] 3,821,854
[45] July 2, 1974

[54] DEPTH MICROMETER

[76] Inventors: Edwin Koch, R.D. No. 1, Deposit, N.Y. 13754; William Koch, 150-19 Eleventh Ave., Whitestone, N.Y. 11357

[22] Filed: Jan. 26, 1973

[21] Appl. No.: 326,872

[52] U.S. Cl. .............................. 33/169 B, 33/164 R
[51] Int. Cl. ............................................. G01b 3/28
[58] Field of Search .......... 33/169 B, 178 R, 164 R, 33/166, 167, 181 AT, 169 R, 169 C, 169 D, 164 C, 164 P

[56] References Cited
UNITED STATES PATENTS

| | | | |
|---|---|---|---|
| 495,019 | 4/1893 | Carter et al. | 33/164 C |
| 519,541 | 5/1894 | McBride | 33/167 |
| 2,520,022 | 8/1950 | Vobeda | 33/169 B |
| 2,844,881 | 7/1958 | Stunkel | 33/178 R |

Primary Examiner—Louis R. Prince
Assistant Examiner—Willis Little
Attorney, Agent, or Firm—Richard G. Stephens

[57] ABSTRACT

A precision depth micrometer gauge comprises a block having a flat reference surface from which a measuring rod adjustably extends, the measuring rod being slidably and non-rotatably supported within a shaft extending from the block, with an internally threaded barrel fixedly mounted on the end of the shaft. A pair of coaxial interconnected sleeves surround the shaft and rod, the inner sleeve being in threaded engagement with the barrel and both sleeves being rotatable relative to the rod. The end of the outer sleeve remote from the block is read against a scale inscribed on the barrel. The arrangement provides additive direct reading, so that measurements are calculated in the same manner as with a caliper micrometer guage.

8 Claims, 5 Drawing Figures